(12) United States Patent
Tobita

(10) Patent No.: US 9,395,470 B2
(45) Date of Patent: Jul. 19, 2016

(54) MOLDED-ARTICLE MANUFACTURING METHOD, MOLD, AND OPTICAL ELEMENT INCLUDING FRESNEL LENS

(71) Applicant: CANON KABUSHIKI KAISHA, Tokyo (JP)

(72) Inventor: Shuusuke Tobita, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 189 days.

(21) Appl. No.: 13/804,200

(22) Filed: Mar. 14, 2013

(65) Prior Publication Data

US 2013/0265655 A1    Oct. 10, 2013

(30) Foreign Application Priority Data

Apr. 5, 2012 (JP) .................. 2012-086502

(51) Int. Cl.
| | |
|---|---|
| G02B 3/08 | (2006.01) |
| B29C 45/26 | (2006.01) |
| B29D 11/00 | (2006.01) |
| B29C 45/17 | (2006.01) |

(52) U.S. Cl.
CPC ............... *G02B 3/08* (2013.01); *B29C 45/174* (2013.01); *B29C 45/2632* (2013.01); *B29D 11/00269* (2013.01); *B29C 45/1706* (2013.01); *B29C 2045/1702* (2013.01); *B29C 2045/1741* (2013.01)

(58) Field of Classification Search
CPC ............... G02C 2202/20; H01L 33/58; H01L 27/14687; H01L 27/14683; G02B 1/041; G02B 3/08; G02B 6/0065; G02B 7/02; B29C 2045/0027; B29C 43/36; B29C 45/162; B29C 45/174; B29C 45/2632; B29C 45/73; B29C 49/0031

USPC .................................................. 359/742–743
See application file for complete search history.

(56) References Cited

U.S. PATENT DOCUMENTS 4,170,616 A * 10/1979 Jebens ........................ 264/1.7
5,840,352 A    11/1998 Shimizu et al.

FOREIGN PATENT DOCUMENTS

| CN | 101041258 A | 9/2007 |
|---|---|---|
| EP | 139275 A1 | 5/1985 |
| EP | 914919 A1 | 5/1999 |
| EP | 1738887 A1 | 1/2007 |
| JP | S56-121748 A | 9/1981 |
| JP | H10-138305 A | 5/1998 |
| JP | 11-245257 A | 9/1999 |
| JP | 2001-047523 A | 2/2001 |
| JP | 2007-283752 A | 11/2007 |

* cited by examiner

*Primary Examiner* — Alicia M Harrington
(74) *Attorney, Agent, or Firm* — Canon U.S.A., Inc., IP Division

(57) ABSTRACT

A center-portion molding member having a center-portion transfer shape surface and a side wall surface is inserted and fitted in a frame-portion molding member having a frame-portion transfer shape surface to form a part of a cavity. The center-portion molding member has a groove portion in the side wall surface. The groove portion protrudes from the frame-portion transfer shape surface. Before injected resin transfers a shape of the center-portion transfer shape surface, the side wall surface of the center-portion molding member is sealed with the resin to form, between the center-portion transfer shape surface and the resin, a space in which gas is confined.

11 Claims, 13 Drawing Sheets

MOLDED-ARTICLE MANUFACTURING METHOD, MOLD, AND OPTICAL ELEMENT INCLUDING FRESNEL LENS

BACKGROUND OF THE INVENTION

1. Field of the Invention

The present invention relates to a molded-article manufacturing method and a mold using gas-assist injection molding, and more particularly, to an optical element including a Fresnel lens.

2. Description of the Related Art

Various injection molding methods have recently been developed to meet the demand to increase the accuracy and function of injection-molded resin articles. One of the injection molding methods is a gas-assist injection molding method that subjects resin to injection molding by injecting gas into a mold during injection molding of the resin. In this method, the gas acts on the resin to decrease the viscosity of the resin, to foam the resin, or to color or reform the resin.

Japanese Patent Laid-Open No. 11-245257 proposes a gas-assist injection molding method that can accurately transfer a surface state of a mold onto an article to be molded. In this method, a cavity of a mold is filled with a specific gas, such as carbon dioxide, at an adequate gas pressure, and fluid resin is also filled therein. Thus, the gas is absorbed by a flow front of the resin, or enters an interface between the mold and the resin and is dissolved in a resin surface layer. The gas dissolved in the resin functions as a plasticizer, and decreases the melt viscosity of the resin, particularly, selectively decreases the setting temperature of the resin surface. When the setting temperature of only the thin resin surface layer thereby falls below the surface temperature of the mold, the resin does not set during the resin filling step. This method enhances the mold surface transferability on an article to be molded.

SUMMARY OF THE INVENTION

The gas-assist injection molding method can be suitably used particularly when molding an optical element, such as a Fresnel lens, on which a precise shape is accurately transferred. In a typical Fresnel lens, a lens surface is spherical, and the height of a zone gradually increases from the center zone to the outer peripheral zone. The pitch of the zones is fixed at about tens of micrometers from the inner periphery to the outer periphery. However, it is difficult to homogeneously transfer a high-quality shape on the entire surface on which the shape should be transferred accurately.

FIGS. 16A and 16B illustrate an example of a Fresnel lens. FIG. 16A is a conceptual top view of the Fresnel lens, and FIG. 16B is a conceptual sectional view, taken along line XVIB-XVIB of FIG. 16A. The Fresnel lens includes a first zone 97, a second zone 98, a third zone 99, a fourth zone 110, a fifth zone 111, a sixth zone 112, a seventh zone 113, an eighth zone 114, a gate 118, and a frame 126. It is difficult to conduct accurate transfer particularly on the Fresnel lens of FIGS. 16A and 16B in which the zones are circular but a molded lens itself is rectangular. Since the zones are circular but the molded lens itself is rectangular, there are a portion where the shape of the zones changes from a circular shape to an arc shape (from 111 to 112) and a portion where the arc shape is further divided into short arc shapes (from 112 to 113). It is considered that moldability differs among the portions where the zone shape is a circular shape, an arc shape, and a short arc shape even in one surface (transfer surface) of the same mold cavity that transfers the shape onto an article to be molded. That is, while the zones that do not interfere with the frame shape are completely circular, when the diameter of the zones increases, the zones are divided by interfere with the frame shape. The interfering zones are cut at ends into an arc shape.

In gas-assist molding, gas filled in the cavity is dissolved in injected resin. Grooves of the circular zones do not include a portion from which the gas escapes, and this promotes dissolution. In contrast, gas is discharged by being pushed out from cut ends of grooves of the arc-shaped zones as the resin flows in, and this hinders dissolution. It is considered that this difference in moldability forms a shape difference between the inner zones and the outer zones. For this reason, in the molded article, streaks sometimes appear in the portion where the zone shape changes from the circular shape to the arc shape and the portion where the zone shape changes from the arc shape to the divided short arc shape.

The present invention provides a molded-article manufacturing method and a mold that can transfer, on an article to be molded, a homogeneous and high-quality shape on the entire surface of the mold (transfer shape surface) for transferring the shape.

A molded-article manufacturing method according to an aspect of the present invention transfers shapes of a center-portion transfer shape surface, a side wall surface, and a frame-portion transfer shape surface provided in a cavity onto resin by injecting gas and the resin into the cavity. The side wall surface has a groove portion. A center-portion molding member is inserted and fitted in a frame-portion molding member to form the cavity so that a portion of the side wall surface from the frame-portion transfer shape surface to the groove portion protrudes.

A mold according to another aspect of the present invention includes a gas supply unit configured to inject gas into a cavity, a resin injection unit configured to inject resin into the cavity, a center-portion molding member having a center-portion transfer shape surface and a side wall surface, a frame-portion molding member having a frame-portion transfer shape surface, and a gate provided in the frame-portion molding member. The side wall surface has a groove portion, and the center-portion molding member is inserted and fitted in the frame-portion molding member to form the cavity so that a portion of the side wall surface from the frame-portion transfer shape surface to the groove portion protrudes.

An optical element having a Fresnel lens according to a further aspect of the present invention forms an image on a focal plane. The optical element includes a center portion having a polygonal outer shape, and a frame portion surrounding the center portion. Grooves are provided in the center portion. A height from the focal plane to tops of the grooves is less than a height from the focal plane to an upper surface of the frame portion.

Further features of the present invention will become apparent from the following description of exemplary embodiments with reference to the attached drawings.

DESCRIPTION OF THE EMBODIMENTS

Embodiments of the present invention will be described below with reference to the drawings.

First Embodiment

FIGS. 1A to 1E illustrate a molded-article manufacturing method according to a first embodiment of the present invention. The molded-article manufacturing method of the first embodiment is suited to manufacture optical elements, particularly, an optical element, such as a Fresnel lens, on which a precise shape should be transferred. In the first embodiment, a description will be given of a manufacturing method for an optical element (focusing screen) including a Fresnel lens as an example of a molded article.

Figure 1A:
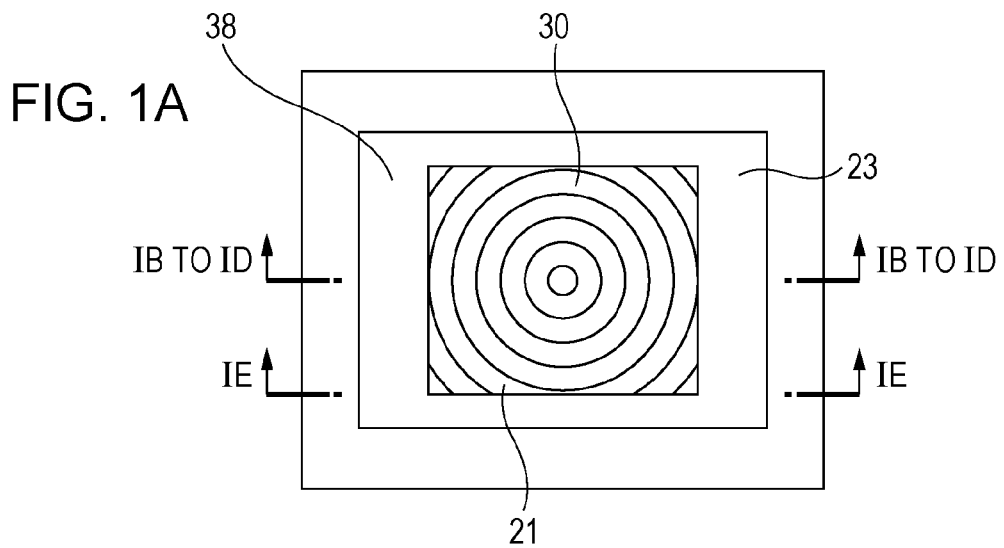
FIGS. 1A to 1E illustrate a first embodiment.
Figure 1B:
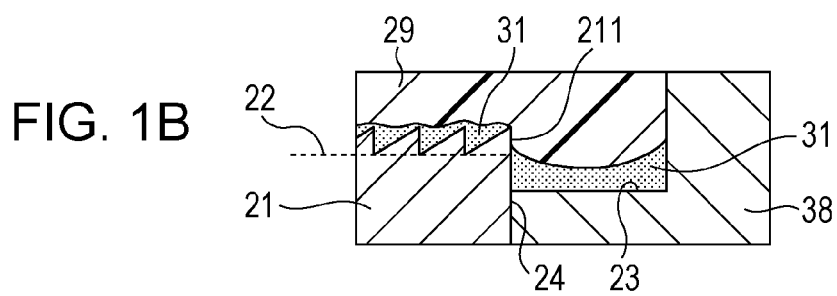
Figure 1C:
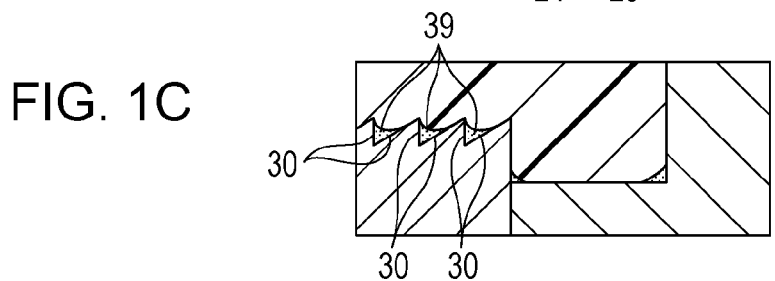
Figure 1D:
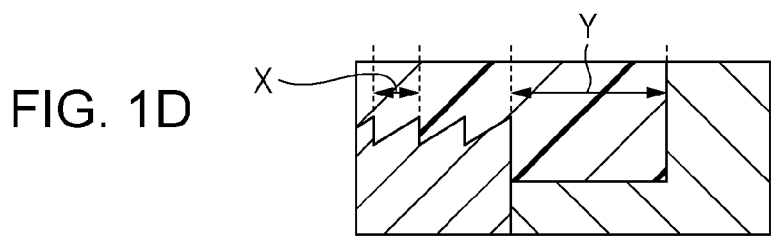
Figure 1E:
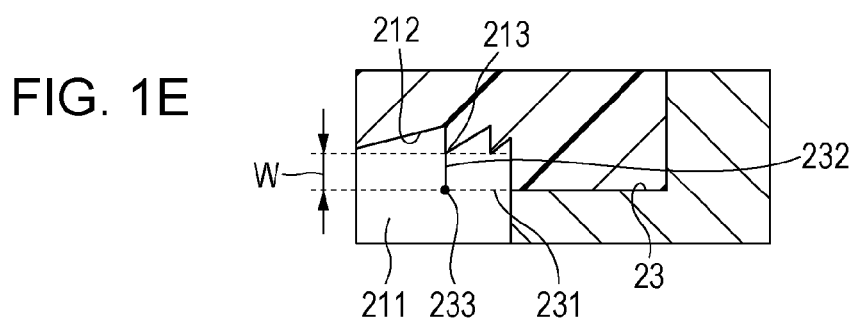

FIG. 1A schematically illustrates a part of a cavity. A center-portion molding member 21 has a center-portion transfer shape surface 30 on which a transfer shape is engraved to transfer a groove shape of a Fresnel grating or a diffraction grating. A frame-portion molding member 38 is provided to surround an outer periphery of the center-portion molding member 21. The frame-portion molding member 38 has a frame-portion transfer shape surface 23. FIGS. 1B to 1D are schematic partial sectional views taken along line IB TO ID-IB TO ID of FIG. 1A. FIG. 1E is a schematic partial sectional view taken along line IE-IE of FIG. 1A such that a side face of the center-portion molding member 21 is exposed. As illustrated in FIG. 1E, when a shape, such as grooves, is engraved on the center-portion molding member 21, groove portions 212 continuing from the center-portion transfer shape surface 30 are also formed in a side wall surface 211 of the center-portion molding member 21. In bottom portions 213 of the groove portions 212, the side wall surface 211 is cut most deeply (the side wall surface 211 is the lowest). The groove portions 212 protrude from the frame-portion transfer shape surface 23. By this structure, a portion of the side wall surface 211 between the groove portions 212 and the frame-portion transfer shape surface 23 can be sealed with resin to form, between the center-portion transfer shape surface 30 and the resin, a space in which gas is confined. A length W of the portion of the side wall surface 211 from the frame-portion transfer shape surface 23 to the groove portions 212 is preferably set to be within the range of 20 to 100 μm. The length W of the portion of the side wall surface 211 from the frame-portion transfer shape surface 23 to the groove portions 212 can be found by dropping a perpendicular 232 from the bottom portions 213 of the groove portions 212 to a plane 231 including the frame-portion transfer shape surface 23 and measuring the distance between the bottom portions 213 and a point 233 where the perpendicular 232 intersects the plane 231.

Figure 4A:
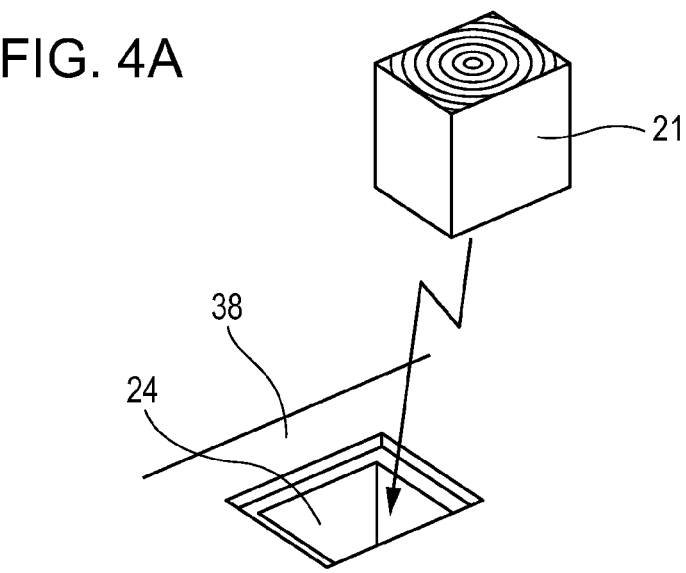
FIGS. 4A to 4C illustrate the relationship between a center-portion molding member and a frame-portion molding member.
Figure 4B:
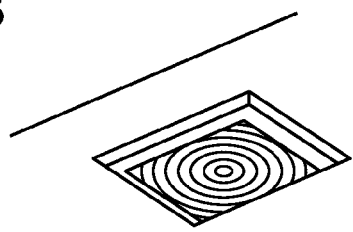
Figure 4C:
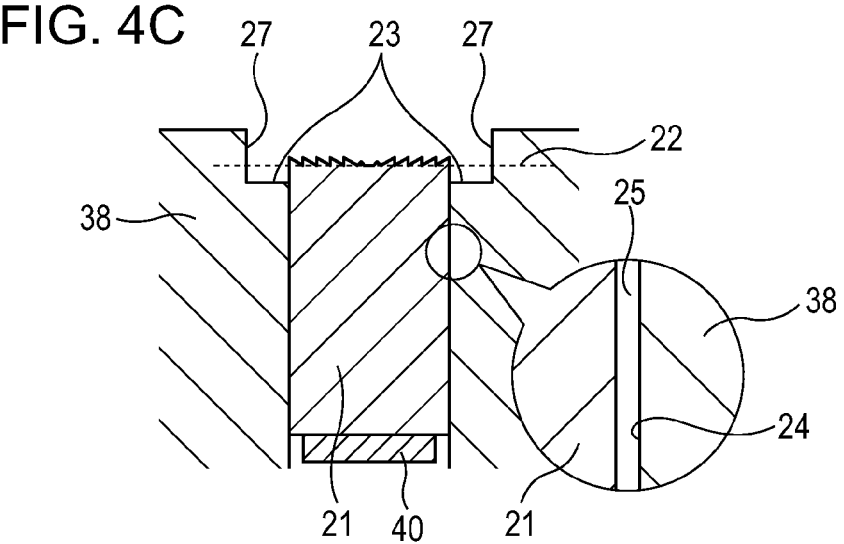

FIGS. 4A to 4C illustrate the relationship between the center-portion molding member 21 and the frame-portion molding member 38. The frame-portion molding member 38 may be a die set. While the frame-portion molding member 38 may be movable or stationary, it is preferably movable for easy mold release. An insert pocket 24 is provided in the frame-portion molding member (die set) 38 to receive the center-portion molding member 21. FIG. 4A illustrates a state before the center-portion molding member 21 is inserted and fitted in the insert pocket 24 of the frame-portion molding member (die set) 38, and FIG. 4B illustrates a state after the center-portion molding member 21 is inserted and fitted in the insert pocket 24. FIG. 4C is a cross-sectional view (including a partial enlarged view) illustrating a state in which the center-portion molding member 21 is inserted and fitted in the insert pocket 24 of the frame-portion molding member (die set) 38. FIG. 4C illustrates the center-portion molding member 21, an auxiliary line 22, the frame-portion transfer shape surface 23, the insert pocket 24 of the frame-portion molding member (die set) 38, a clearance 25, an adjusting component 40, a stepped portion 27, and the frame-portion molding member (die set) 38. The auxiliary line 22 indicates the positions of the bottom portions 213 of the groove portions 212. The adjusting component 40 changes the length W of the portion of the side wall surface 211 between the groove portions 212 and the frame-portion transfer shape surface 23. The stepped portion 27 is provided at a mouth of the insert pocket 24 of the frame-portion molding member (die set) 38 to transfer a frame 26 of a Fresnel molded article. Drilling is suited to work the center-portion transfer shape surface 30 for transferring a grating shape such as a Fresnel grating. For this reason, it is difficult to directly form the center-portion transfer shape surface 30 on the frame-portion molding member (die set) 38. The center-portion molding member 21 is separately formed, and is inserted and fitted in the insert pocket 24 of the frame-portion molding member (die set) 38, whereby an integral mold is obtained. Also, the clearance 25 is thereby formed between the center-portion molding member 21 and the frame-portion molding member (die set) 38. Preferably, the clearance 25 is within the range of 10 to 50 μm.

Figure 3:
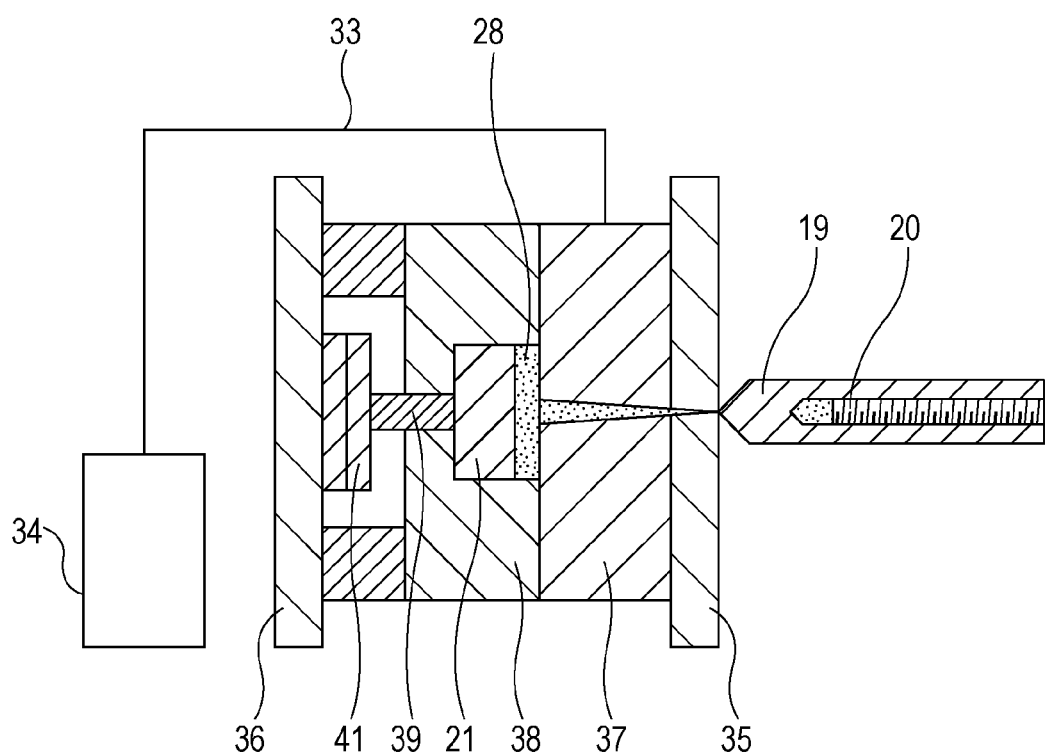
FIG. 3 schematically illustrates an example of a gas-assist injection mold.

FIG. 3 schematically illustrates an example of a gas-assist injection mold, in which a frame-portion molding member is formed by a movable die set. Referring to FIG. 3, melted resin is injected from a cylinder 19 into a cavity 28, which is defined by a center-portion molding member 21, a movable die set 38, and a stationary die set 37, while rotating a screw 20 (a resin injection unit). Gas is supplied from a gas supplier 34 to the cavity 28 through a pipe 33 (a gas supply unit). Reference numerals 35, 36, 39, and 41 denote a stationary attachment plate, a movable attachment plate, an ejector rod, and an ejector plate, respectively. A molded article is thus formed by injecting gas and resin into the cavity 28. The center-portion molding member 21 is inserted and fitted in a pocket of the movable die set 38 to form the cavity 28 between the center-portion molding member 21 and the stationary die set 37.

A pocket may also be formed in the other die set (the stationary die set 37 in FIG. 3). For example, a molding member having a shape for molding a microlens array may be inserted and fitted in this pocket. This makes it possible to mold an optical element, such as a focusing screen, in which a microlens array is provided on a surface opposite a Fresnel lens.

While a seal member is assembled in a die separate portion to hold the injected gas in the mold, illustration thereof is omitted.

Next, a description will be given of an example of a molded-article manufacturing method using this mold. First, gas 31 is injected from the gas supplier 34 into the cavity 28 through the pipe 33, and melted resin 29 is injected from the cylinder 19 into the cavity 28 via a gate while rotating the screw 20. The gas 31 may be injected before, simultaneously with, or immediately after injection of the resin 29. Preferably, the gate is formed in the frame-portion molding member 38.

When the resin 29 reaches the cavity 28, the gas 31 is pushed out from the clearance 25 between the center-portion molding member 21 and the movable die set 38. In a state in which holding pressure is not completely applied, the center-portion transfer shape surface 30 is not completely transferred onto the resin 29, and an enclosed space 39 in which the gas 31 is confined is provided between the center-portion transfer shape surface 30 and the resin 29. This state is illustrated in FIG. 1B. As described above, the bottom portions 213 where the groove portions 212 provided in the side wall surface 211 are the lowest (deepest) protrude from the frame-portion transfer shape surface 23. With this structure, a space where the resin 29 flows around the center-portion molding member 21 during resin filling is formed, and the resin 29 can be sufficiently brought into tight contact with the portion of the side wall surface 211 between the groove portions 212 and the frame-portion transfer shape surface 23 before it receives the shape of the center-portion transfer shape surface 30. Thus, the space between the center-portion transfer shape surface 30 and the resin 29 can be closed to form the enclosed space 39. Preferably, the length W of the portion of the side wall surface 211 between the groove portions 212 and the frame-portion transfer shape surface 23 is set to be within the range of 20 to 100 µm. If the length W is shorter than 20 µm even in a part of the side wall surface 211, sealing is not entirely performed in a certain portion, and the gas 31 is removed from that portion. Therefore, it is difficult to uniformly transfer the entire center-portion transfer shape surface 30. More specifically, in relation to the amount of gas dissolved in the resin, the molding condition is different between a zone where the space between the center-portion transfer shape surface and the resin is sealed with the resin and the gas is confined in the enclosed space and a zone where the space is not sealed with the resin and the gas is released. Because of this difference in molding condition, after mold release, the deformation amount of the inclined face of the zone in the molded article (flatness of the inclined face) sometimes differs between the zone where the gas is confined and is sufficiently dissolved in the resin and the zone where the gas is released and is not sufficiently dissolved in the resin. These portions that are different in deformation amount (flatness of the inclined face) form shades, whereby streaks appear in the molded article. If the length W is longer than 100 µm, the mold release resistance increases, and mold release failure is apt to occur. Further, a width Y of the frame portion is preferably more than a width X of the grooves on the center-portion transfer shape surface 30, more preferably 0.30 mm or more. This is because, if the width Y of the frame portion is too small, the resin 29 does not easily flow around the side wall surface 211, and this reduces the sealing force. With this structure, since the volume of the frame portion is more than that of the grooves, the resin 29 can be preferentially filled in the frame portion. This allows more gas to be confined in the enclosed space 39. Alternatively, the resin 29 can be preferentially filled in the frame portion by forming, in the frame-portion molding member 38, the gate serving as an entrance from which the resin 29 is injected into the cavity 29. The gas 31 confined in the enclosed space 39 is dissolved in the resin 29 and plasticizes the resin 29. When the resin 29 is plasticized, it decreases its viscosity.

After this state, a dwelling step is performed. The enclosed space 39 is gradually squashed by a predetermined resin pressure, as illustrated in FIG. 1C. When the resin plasticized and decreased in viscosity receives internal pressure in the dwelling step, the center-portion transfer shape is uniformly and accurately transferred thereon. Since the center-portion molding member 21 is sealed with the resin, the gas uniformly acts on the entire center-portion transfer shape surface 30 of the center-portion molding member 21, and transfer is completed. This state is illustrated in FIGS. 1D and 1E. In this way, a mold structure that allows gas to be uniformly confined on the entire center-portion transfer shape surface 30 can be obtained without forming a separate seal structure. Since all zones are uniformly formed in a molded article thus obtained, no external defect is caused, and the molded article is good.

While a plurality of groove portions 212 are provided in the side wall surface 211 in the first embodiment, the advantage of the present invention is provided even when only one groove portion is provided. When a plurality of groove portions are provided, the length W of the portion of the side wall surface 211 from the frame-portion transfer shape surface 23 to the groove portions 212 is preferably set to be within the range of 20 to 100 µm. However, even when the length W of the portion of the side wall surface 211 from the frame-portion transfer shape surface 23 to at least one of the groove portions 212, the advantage of the present invention is provided in part. The sectional shape of the groove portions 212 is not limited to a triangular shape as in the first embodiment, and may be freely determined, for example, may be a curved shape or a polygonal shape.

Figure 2A:
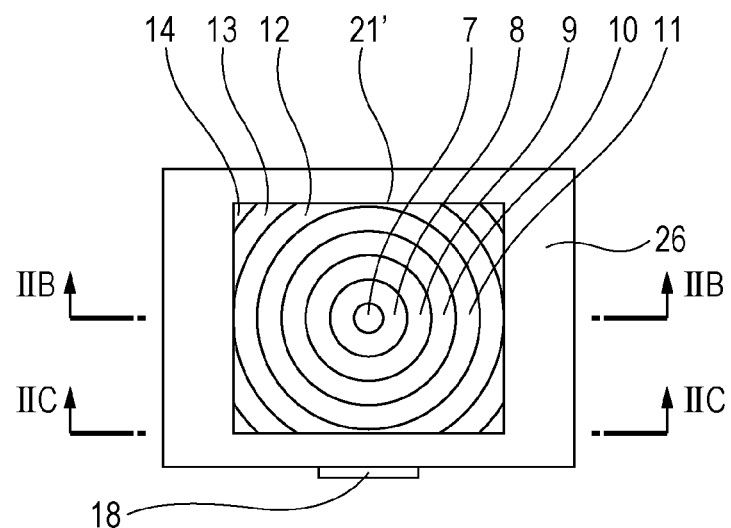
FIGS. 2A to 2C illustrate an optical element (focusing screen) including a Fresnel lens.
Figure 2B:
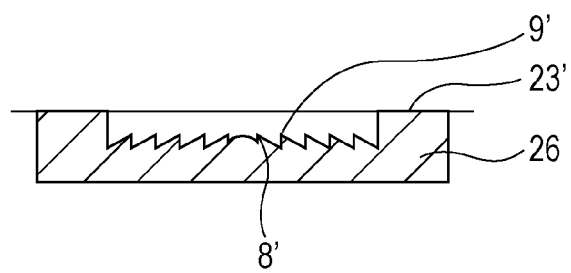
Figure 2C:
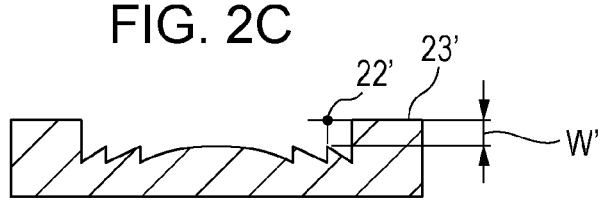

Next, an example of a molded article manufactured by the molded-article manufacturing method according to the first embodiment will be described with reference to FIGS. 2A to 2C. FIGS. 2A to 2C illustrate an optical element (focusing screen) including a Fresnel lens as an example of a molded article. FIG. 2A is a conceptual top view of an optical element (focusing screen) including a Fresnel lens, and FIG. 2B is a conceptual sectional view taken along line IIB-IIB of FIG. 2A. FIG. 2C is a conceptual sectional view taken along line IIC-IIC of FIG. 2A. The optical element includes a center portion 21' having a polygonal outside shape, and a frame portion 26 surrounding the center portion 21'. A grating (zones) is provided in the center portion 21'. The zones include a first zone 7, a second zone 8, a third zone 9, a fourth zone 10, a fifth zone 11, a sixth zone 12, a seventh zone 13, and an eighth zone 14. Reference numeral 18 denotes the position of a gate, and reference numeral 23' denotes an upper surface of the frame portion 26. A Fresnel lens has a zonal structure formed by cutting out a lens surface to form zones and concentrically arranging the zones on a plane, and can be considered as an aggregate of prisms. In general, in order for the lens to have sufficient power, the curvature increases and the lens becomes thicker. By making the lens into a Fresnel lens, the lens can have a light collecting function while having a flat structure. This achieves compactness and high integration properties. Particularly for an optical element in which zones are circular but the molded element itself is rectangular, accurate transfer is difficult, and flatness unevenness sometimes occurs among inclined faces of the zones. However, in the optical element of the first embodiment, flatness unevenness among the inclined faces of the zones can be limited to 10 nm or less by setting a length W' from an intersection 22' of tops of the zones and the frame portion 26 to a flat surface including the upper surface 23' of the frame portion 26 to be within the range of 20 to 100 µm. This avoids external defects such as streaks, and suppresses deterioration of the optical characteristic of the molded article. The length (height difference) W' from the intersection 22' of the tops of the zones and the frame portion 26 to the flat surface including the upper surface 23' of the frame portion 26 is defined as a length of the upper surface 23' of the frame portion 26 from the tops of the zones of the grating. Flatness unevenness among the inclined faces can be found as follows. First, several points on the inclined face of each zone of the grating are set as measuring points, flatness is measured for all zones, and the difference between the highest flatness and the lowest flatness is taken as flatness unevenness.

The optical element including the Fresnel lens is not limited to the focusing screen for a viewfinder of a camera illustrated in FIGS. 2A to 2C, and may be, for example, a back-projection screen and a condenser lens in an overhead projector.

Figure 5:
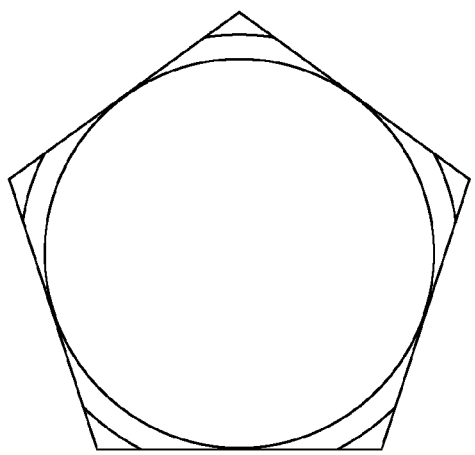
FIG. 5 illustrates a modification.

The outside shape of the center portion 21' may be a rectangular shape, a polygonal shape, such as a pentagonal shape illustrated in FIG. 5, or other shapes.

The transfer surface of the frame portion 26 does not always need to be flat, and may be a curved surface or may include fine irregularities.

Second Embodiment

Figure 6A:
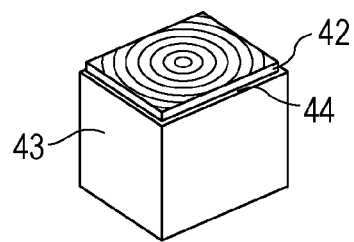
FIGS. 6A to 6C illustrate a second embodiment.
Figure 6B:
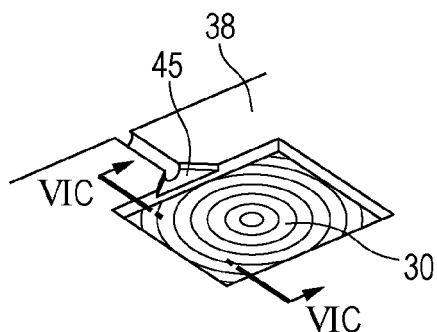
Figure 6C:
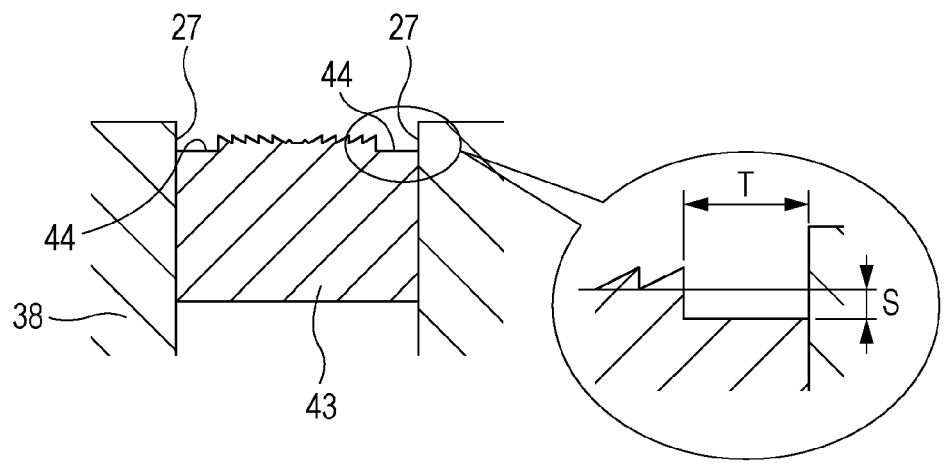

In the above-described first embodiment, the frame-portion transfer shape surface is formed on the frame-portion molding member (die set) having the space (insert pocket) that receives the center-portion molding member 21. Alternatively, a frame-portion transfer shape surface can be formed on a center-portion molding member. This structure will now be described as a second embodiment. FIGS. 6A to 6C illustrate the second embodiment. Constituent elements having the same functions as the functions of the constituent elements of FIGS. 4A to 4C are denoted by the same reference numerals, and descriptions thereof are skipped.

FIG. 6A illustrates a center-portion molding member 43 having a side wall surface 42. The side wall surface 42 and a frame-portion transfer shape surface 44 are formed on an outer periphery of a center-portion transfer shape surface by forming a cutout on the entire outer edge of a center-portion transfer shape surface 30.

FIGS. 6B and 6C illustrate the relationship between the center-portion molding member 43 and a frame-portion molding member (or a die set) 38. FIG. 6B illustrates a state in which the center-portion molding member 43 is assembled in the frame-portion molding member (die set) 38. FIG. 6B illustrates the center-portion shaper transfer surface 30, and a gate 45. FIG. 6C is a schematic cross-sectional view taken along line VIC-VIC of FIG. 6B (including a partial enlarged view) illustrating a state in which the center-portion molding member 43 is assembled in the frame-portion molding member (die set) 38. FIG. 6C illustrates the center-portion molding member 43, the frame-portion transfer shape surface 44 provided on the center-portion molding member 43, and a surface 27 of the frame-portion molding member 38 for transferring an outer wall of a frame portion of a molded article.

Figure 7A:
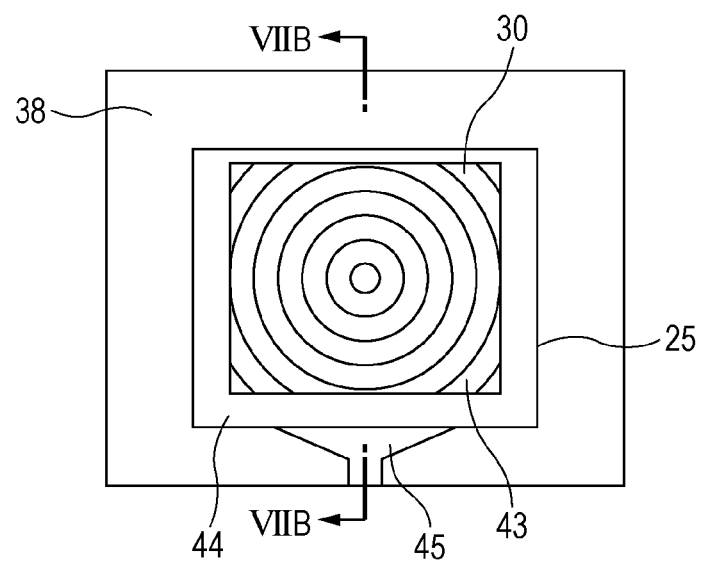
FIGS. 7A and 7B illustrate the second embodiment.
Figure 7B:
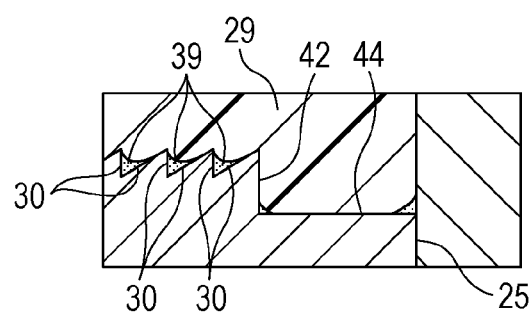

FIGS. 7A and 7B illustrate a state in which the center-portion molding member 43 of FIGS. 6A to 6C is assembled in the gas-assist injection mold illustrated in FIG. 3. FIG. 7A is a schematic view of a movable die in an open state of the mold, as viewed from a stationary side. FIG. 7B schematically illustrates a state in which resin is injected in a cavity together with gas. The center-portion molding member 43 has the center-portion molding shape surface 30 on which a transfer shape for transferring a groove shape of a Fresnel grating is engraved. The entire outer periphery of the center-portion molding member 43 is cut out to form the frame-portion transfer shape surface 44. The frame-portion molding member (die set) 38 has a space (insert pocket), and the center-portion molding member 43 is inserted in the pocket. A clearance 25 is provided at the boundary between the center-portion molding member 43 and the frame-portion molding member 38. Reference numeral 45 denotes a gate.

FIG. 7B is a schematic partial sectional view taken along line VIIB-VIIB of FIG. 7A. In a dwelling step illustrated in FIG. 7B, resin 29 flows along a frame portion defined by the frame-portion transfer shape surface 44 and the side wall surface 42, which are formed by the cutout portion on the outer periphery of the center-portion transfer shape surface 30, and the frame-portion molding member 38. Thus, the resin 29 comes into tight contact with the side wall surface 42, and closes a gap between the center-portion transfer shape surface 30 and the resin 29 to form an enclosed space 39, whereby gas is uniformly confined and held on the center-portion transfer shape surface 30.

This structure can increase the distance from the center-portion transfer shape surface 30 to the clearance 25 provided between the center-portion molding member 43 and the frame-portion molding member (die set) 38. Moreover, when the resin 29 is filled, the gas is confined by two surfaces, that is, the side wall surface 42 and the frame-portion transfer shape surface 44 formed by the cutout portion. Hence, the gas sealing effect on the center-portion transfer shape surface 30 is enhanced, and the quality of a molded article is improved.

In the structure of the first embodiment in which the frame portion of the molded article is formed by the frame-portion molding member (die set), in order for the groove portions of the center-portion transfer shape surface to protrude from the frame-portion transfer shape surface, it is necessary to assemble the thickness adjusting component 40 under the center-portion molding member. In this case, it is essential to make fine adjustment while performing test molding a plurality of times, and this increases the effort to produce the mold. In contrast, with the structure of the second embodiment, since the length S of the portion of the side wall surface from the frame-portion transfer shape surface to the groove portions (height of the side wall surface) is determined by the working amount of the cutout, the effort to produce the mold can be reduced.

Further, the shape formed by the cutout (shapes of the side wall surface and the frame-portion transfer shape surface) is not subject to fine restrictions.

Figure 8A:
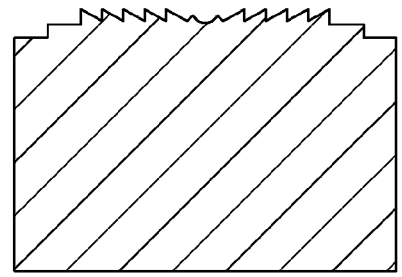
FIGS. 8A to 8C illustrate modifications.
Figure 8B:
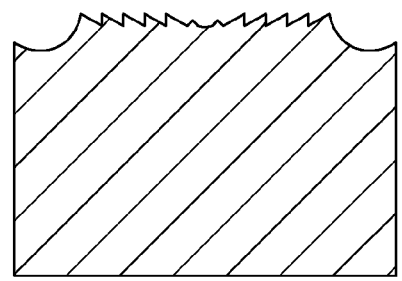
Figure 8C:
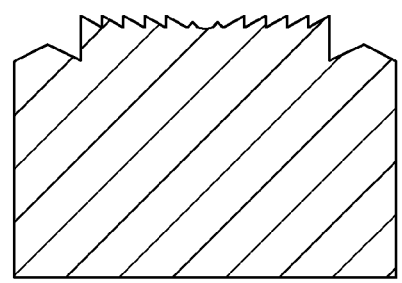

As illustrated in FIG. 8A, the cutout does not always need to be formed by one step, but may be formed by two or more steps. Alternatively, as illustrated in FIG. 8B, the cutout does not always need to have a right angle, but may be formed by a curved surface. As illustrated in FIG. 8C, the cutout does not always need to have a right angle, but may be rectangular.

Figure 9:
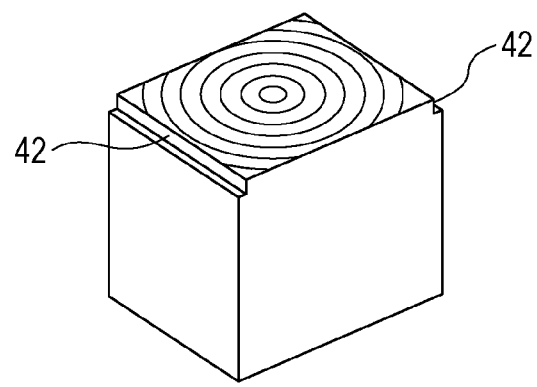
FIG. 9 illustrates a further modification.

Further, the cutout does not always need to be formed all around the periphery of the center-portion transfer shape surface. As illustrated in FIG. 9, cutouts 42 may be formed on only two of four sides that form the rectangular outline.

Figure 10:
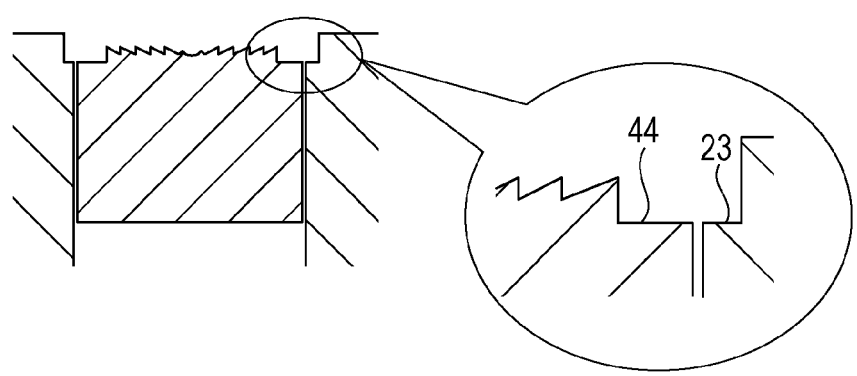
FIG. 10 illustrates a still further modification.

As illustrated in FIG. 10, a good molded article can also be obtained by a structure in which a frame portion is formed by transferring shapes of a part of a cutout and a part of a frame-portion molding member (or die set). While a frame-portion transfer shape surface 44 of a center-portion molding member and a frame-portion transfer shape surface 23 of a frame-portion molding member (die set) are flush with each other in FIG. 10, a height difference may be formed therebetween.

The above-described structures can be combined appropriately.

EXAMPLES

While the present invention will be described in more detail below with reference to examples and a comparative example, it is not limited to these examples.

First Example

Figure 11:
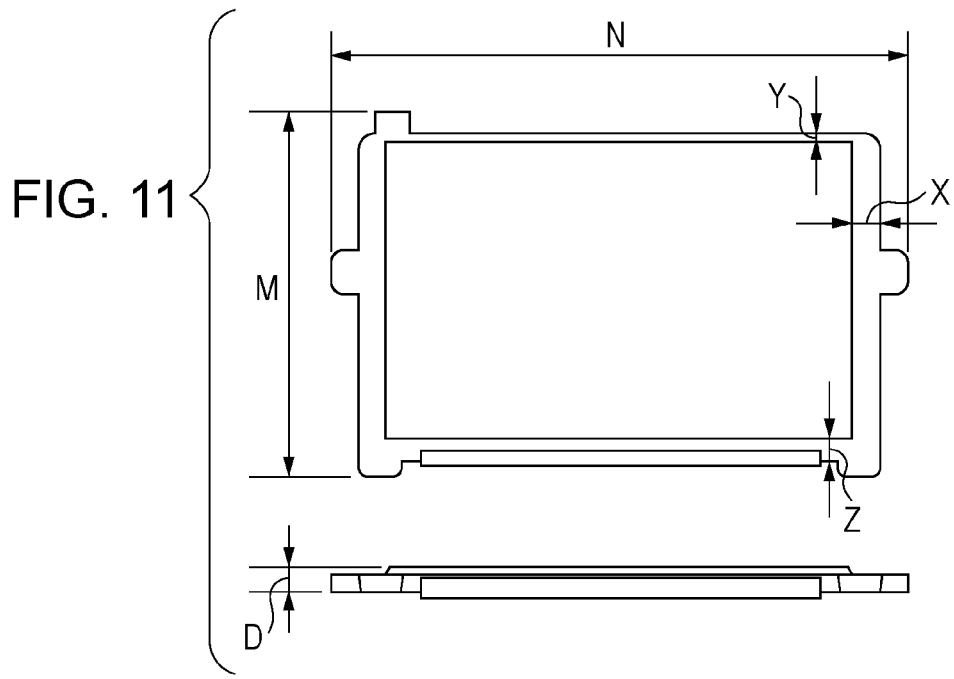
FIG. 11 illustrates a first example.

In a first example, a focusing screen illustrated in FIG. 11 was molded with the mold adopted in the first embodiment.

Acrylic resin was used as a resin material, and carbon dioxide was used as gas. Carbon dioxide taken in from a liquid carbon dioxide tank by a gas supplier was heated to 50° C. and pressurized at 8 MPa, and was injected into a mold in association with a molding machine by being triggered by a signal indicating the screw position in a plasticizing device. The molding machine and the gas supplier were connected by an SUS pipe having an inner diameter of 1.6 mm and a length of 5 m. The screw diameter was 25 mm, the thickness D of the focusing screen was 1.3 mm, and a frame was shaped like a rectangle having a longitudinal length N of 29 mm and a lateral length M of 18.5 mm (FIG. 11). The width of the frame was 1.9 mm on a short side X, 1.3 mm on a gate-side long side Z, and 0.65 mm on an anti-gate side long side Y. The pitch of grating grooves (zones) was 30 μm, and the depth of the outermost peripheral groove was about 19 μm. The depth unevenness among bottom face portions of the grooves was 1 μm or less, and the height of a frame-portion transfer shape surface was obtained at an accuracy of ±1 μm all around the periphery.

The mold had one cavity, and a gate was formed by a fan gate having a thickness of 1 mm.

With the above-described system configuration, gas and resin were injected into the cavity at an injection speed of 2 mm/s and a holding pressure of 62.5 MPa. Molding was performed while a length W of a portion of a side wall surface from the groove portions to the frame-portion transfer shape surface was 41.4 μm. The length W of the portion of the side wall surface from the groove portions to the frame-portion transfer shape surface was adjusted by inserting an adjusting component 40 under a center-portion molding member.

In the first example, no external defect was found, and a good molded article was obtained.

Second Example

Molding was performed in a manner similar to that adopted in the first example, except that the length W of the portion of the side wall surface from the groove portions to the frame-portion transfer shape surface in the first example was changed to 6.5 μm.

No external defect was found, and a good molded article was obtained. Although a faint line shaped like an inscribed circle was visually recognized in the molded article, it was allowable.

Third Example

Molding was performed in a manner similar to that adopted in the first example, except that the length W of the side wall surface from the groove portions to the frame-portion transfer shape surface in the first example was changed to 16.8 μm.

Although a faint line shaped like an inscribed circle was visually recognized in a molded article, it was allowable.

First Comparative Example

Molding was performed in a manner similar to that adopted in the first example, except that the position (height) of the groove portions in the first example was changed to be equal to that of the frame-portion transfer shape surface. A line shaped like an inscribed circle was clearly recognized in a molded article.

Fourth Example

Figure 12:
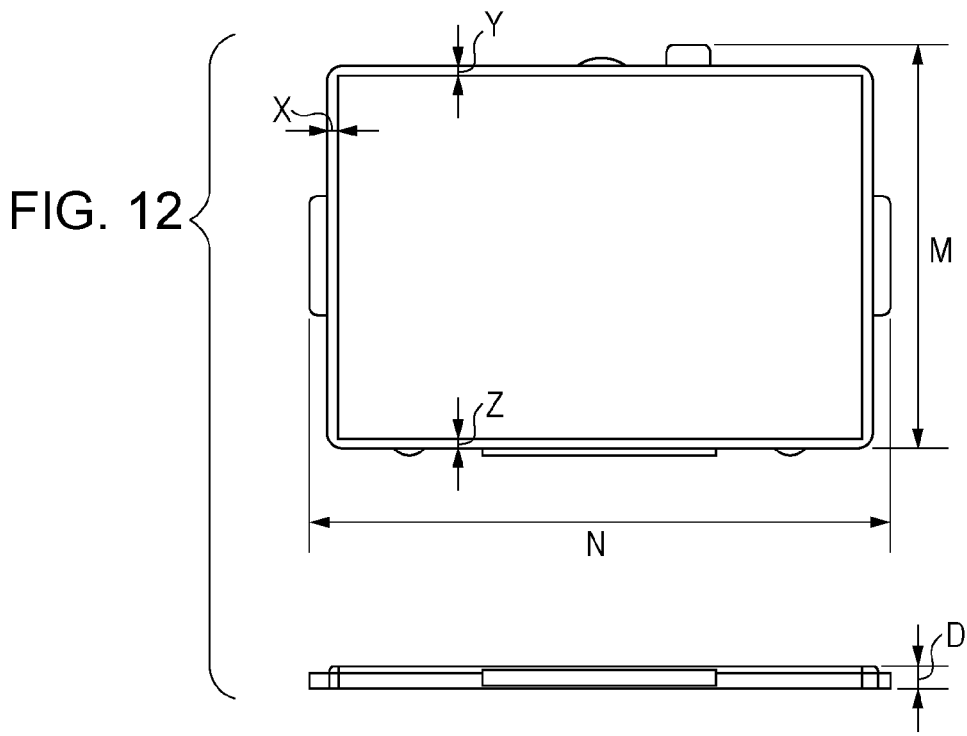
FIG. 12 illustrates a fourth example.

In a fourth example, a focusing screen illustrated in FIG. 12 was molded.

The thickness D was 1.5 mm, and a frame was shaped like a rectangle having a longitudinal length N of 40 mm and a lateral length M of 28 mm (FIG. 12). The pitch of grating grooves was 35 μm, and the height of the outermost peripheral zone was about 27 μm. The width of the frame was 0.5 mm all around the periphery (X, Y, and Z).

Figure 13:
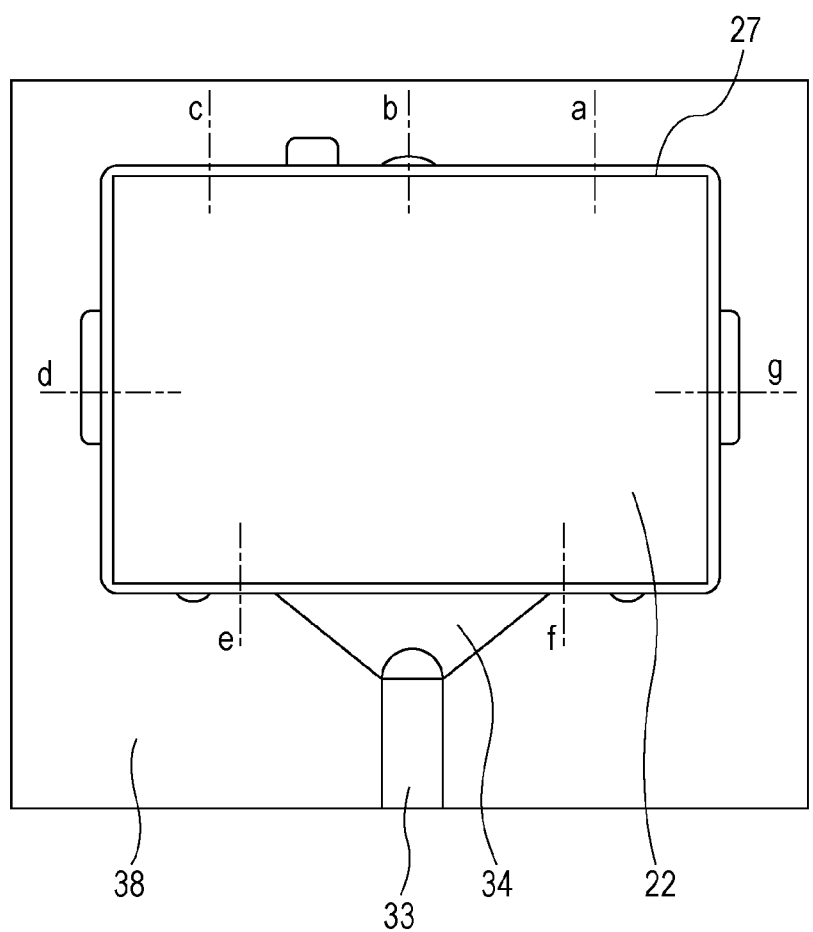
FIG. 13 illustrates the fourth example.

A mold had two cavities corresponding to the size of a molded article, and a gate was formed by a fan gate having a thickness of 1 mm. FIG. 13 schematically illustrates a movable cavity including a runner 33 and a gate 34.

Other molding conditions and facilities are the same as those adopted in the first example.

In the first example, the depth unevenness among the bottom face portions of the grooves was limited to 1 μm or less by high-accuracy machining, and the height of the frame-portion transfer shape surface was obtained at an accuracy of ±1 μm all around the periphery. However, the protrusion amount (length of the portion of the side wall surface from the groove portions to the frame-portion transfer shape surface) W does not always need to be uniform all around the periphery of the cavity in this way. It is satisfactory as long as the protrusion amount W is within a predetermined range all around the periphery of the cavity.

FIG. 13 illustrates the positions of seven measuring points around the cavity. Table 1 shows protrusion amounts W measured at the measuring points. Although insufficient transfer was found in part, it does not have any influence on the appearance.

Fifth Example

Molding was performed in a manner similar to that adopted in the second example, except that the protrusion amount at a measuring point b in the fourth example was changed to 41 μm. The protrusion amount W was within the range of 20 to 100 μm at all measuring points. An external defect was not confirmed, and a good molded article was obtained. It is found that it is more preferable to set the protrusion amount W to be at least 20 μm all around the periphery of the cavity.

TABLE 1

| | | Fourth Example | Fifth Example |
|---|---|---|---|
| Mirror Surface Die Protrusion Amount X [μm] | a | 0.056 | 0.056 |
| | b | 0.010 | 0.041 |
| | c | 0.044 | 0.044 |
| | d | 0.034 | 0.034 |
| | e | 0.020 | 0.020 |
| | f | 0.039 | 0.039 |
| | g | 0.055 | 0.050 |
| Appearance | | OK | Good |

Sixth Example

Figure 14:
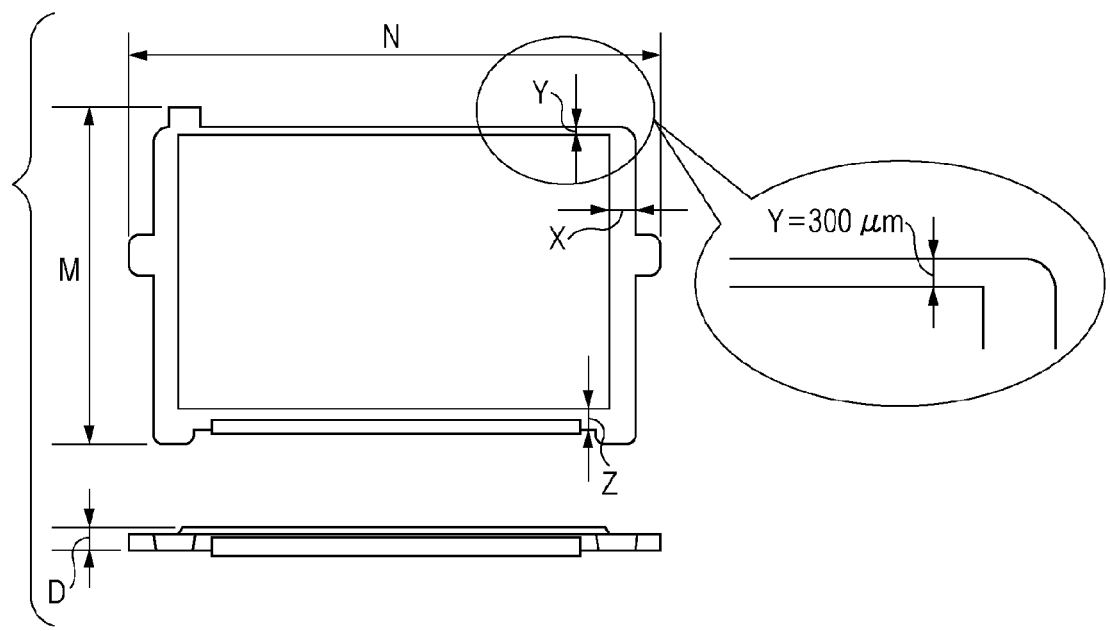
FIG. 14 illustrates a sixth example.

In a sixth example, a focusing screen illustrated in FIG. 14 was molded.

Acrylic resin was used as a resin material, and carbon dioxide was used as gas. Carbon dioxide taken in from a liquid carbon dioxide tank by a gas supplier was heated to 50° C. and pressurized at 8 MPa, and was injected into a mold in association with a molding machine by being triggered by a signal indicating the screw position in a plasticizing device. The molding machine and the gas supplier were connected by an SUS pipe having an inner diameter of 1.6 mm and a length of 5 m. The screw diameter was 25 mm, the thickness D of the focusing screen was 1.3 mm, and a frame was shaped like a rectangle having a longitudinal length N of 29 mm and a lateral length M of 18.5 mm (FIG. 14). The width of the frame was 1.9 mm on a short side X, 1.3 mm on a gate-side long side Z, and 0.30 mm on an anti-gate side long side Y. The pitch of grating grooves (zones) was 30 µm, and the depth of the outermost peripheral groove was about 19 µm. The depth unevenness among bottom face portions of the grooves was 1 µm or less, and the height of a frame-portion transfer shape surface was obtained at an accuracy of ±1 µm all around the periphery.

The mold had one cavity, and a gate was formed by a fan gate having a thickness of 1 mm.

With the above-described system configuration, gas and resin were injected into the cavity at an injection speed of 2 mm/s and a holding pressure of 62.5 MPa. Molding was performed while a length W of a portion of a side wall surface from the groove portions to the frame-portion transfer shape surface was 20 µm. The length W of the portion of the side wall surface from the groove portions to the frame-portion transfer shape surface was adjusted by inserting an adjusting component 40 under a center-portion molding member. Although a quite faint line shaped like an inscribed circle was found in a molded article, the obtained molded article favorably compared with a good molded article.

Seventh Example

Figure 15:
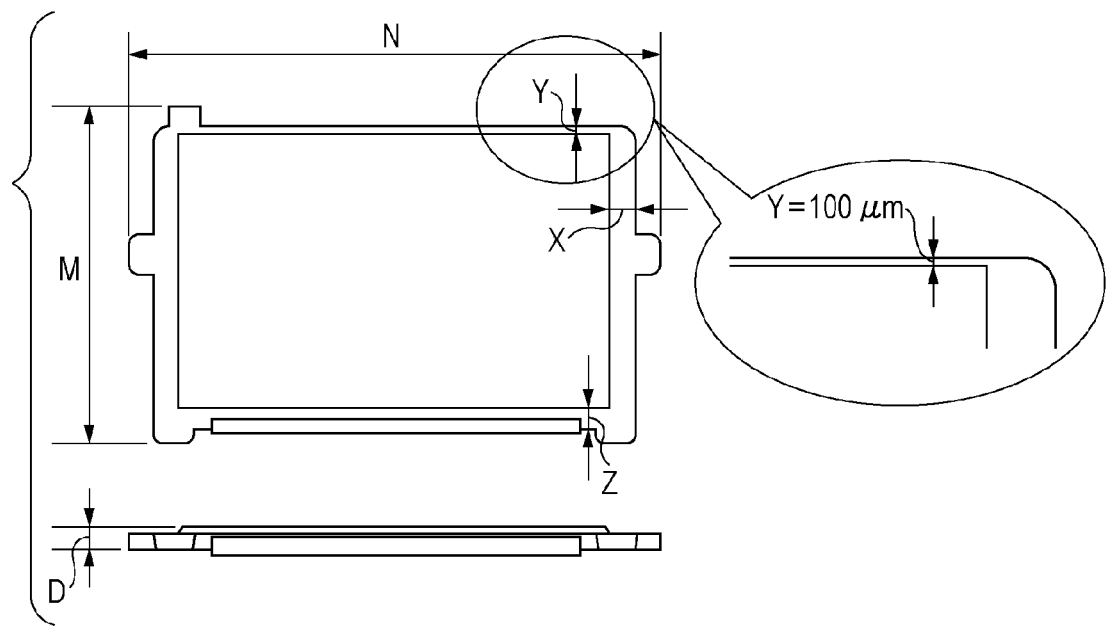
FIG. 15 illustrates a seventh example.
Figure 16A:
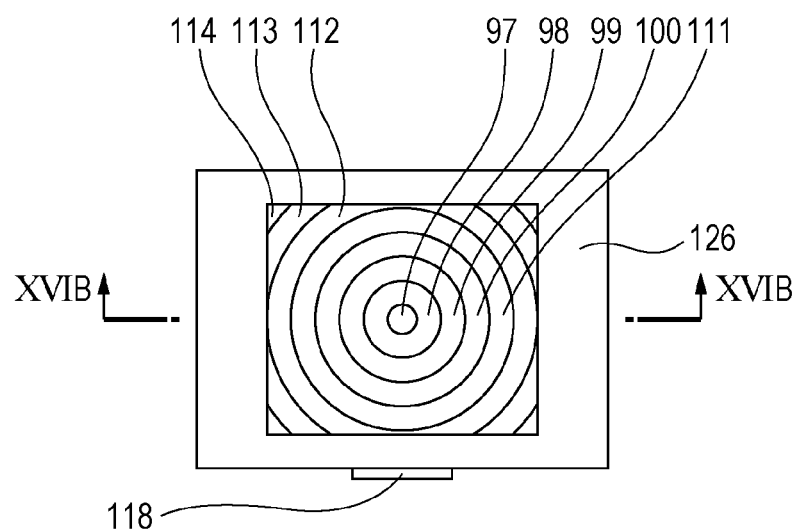
FIGS. 16A and 16B illustrate an optical element (focusing screen) including a Fresnel lens of the related art.
Figure 16B:

Molding was performed by a method similar to that adopted in the sixth example, except that a focusing screen illustrated in FIG. 15 was molded. Compared with the focusing screen of FIG. 14, in the focusing screen of FIG. 15, the width Y of a frame on an anti-gate long side is smaller, that is, 0.10 mm.

Although a faint line shaped like an inscribed circle was found in a molded article, it is allowable. It is found that it is more preferable to set the width of the frame to be at least 0.30 mm all around the periphery of the molded article.

Eighth Example

In an eighth example, a focusing screen illustrated in FIG. 14 was molded.

Molding was performed by a method similar to that adopted in the sixth example, except that a frame portion was formed by transferring the side wall surface 42 and the frame-portion transfer shape surface 44 in the center-portion molding member 43 of the second embodiment (FIG. 6).

The length S of the portion of the side wall surface 42 from the frame-portion transfer shape surface 44 to groove portions was 50 µm, and the width T of the frame portion was 300 µm. An external defect was not confirmed, and a good molded article was obtained.

In a molded article on which a precise shape is transferred, it is possible to obtain a homogeneous and high-quality shape all over a precise transfer shape surface. In particular, it is possible to reduce external defects caused by changes in molding conditions resulting from the change of the shape in the transfer shape surface.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-086502 filed Apr. 5, 2012, which is hereby incorporated by reference herein in its entirety.

What is claimed is:

1. A molded-article manufacturing method that transfers shapes of a center-portion transfer shape surface, a side wall surface, and a frame-portion transfer shape surface provided in a cavity onto resin by injecting gas and the resin into the cavity, the method comprising:
    inserting and fitting a center-portion molding member having the center-portion transfer shape surface and the side wall surface in a frame-portion molding member, the center-portion molding member or the frame-portion molding member having the frame-portion transfer shape surface to form a part of the cavity,
    wherein the center-portion molding member has a groove portion on the side wall surface, the groove portion extending from the center-portion transfer shape surface and protruding from the frame-portion transfer shape surface; and
    sealing a portion, of the side wall surface, from the groove portion to the frame-portion transfer shape surface, with the resin before the shape of the center-portion transfer shape surface is transferred onto the resin, to form, between the center-portion transfer shape surface and the resin, a space in which the gas is confined.

2. The molded-article manufacturing method according to claim 1, wherein a length of the portion is within a range of 20 to 100 µm.

3. The molded-article manufacturing method according to claim 1, wherein a width of the frame-portion transfer shape surface is more than a width of the groove portion.

4. The molded-article manufacturing method according to claim 1, wherein a shape formed on the center-portion transfer shape surface is a Fresnel lens shape.

5. An optical element having a Fresnel lens, the Fresnel lens manufactured by the molded-article manufacturing method according to claim 1.

6. The optical element having the Fresnel lens according to claim 5, wherein a height difference between an upper surface of a frame portion and tops of grooves is within a range of 20 to 100 µm.

7. The optical element having the Fresnel lens according to claim 5, wherein flatness unevenness among inclined portions of grooves is 10 nm or less.

8. A mold comprising:
    a gas supply unit configured to inject gas into a cavity;
    a resin injection unit configured to inject resin into the cavity;
    a center-portion molding member having a center-portion transfer shape surface and a side wall surface;
    a frame-portion molding member having a frame-portion transfer shape surface; and
    a gate provided in the frame-portion molding member,
    wherein the side wall surface has a groove portion, and wherein the center-portion molding member is inserted and fitted in the frame-portion molding member to form the cavity so that a portion, of the side wall surface, from the groove portion to the frame-portion transfer shape surface protrudes.

9. The mold according to claim 8, wherein a length of the portion is within a range of 20 to 100 μm.

10. A mold comprising:
a gas supply unit configured to inject gas into a cavity;
a resin injection unit configured to inject resin into the cavity;
a center-portion molding member including a side wall surface and a frame-portion transfer shape surface that are provided on an outer periphery of a center-portion transfer shape surface and a groove portion provided in the side wall surface;
a frame-portion molding member; and
a gate for injecting the resin into the cavity, the gate being provided in the frame-portion molding member,
wherein the center-portion molding member is inserted and fitted in the frame-portion molding member to form the cavity.

11. The mold according to claim 10, wherein a length of a portion, of the side wall surface, from the groove portion to the frame-portion transfer shape surface is within a range of 20 to 100 μm.

* * * * *